US012260310B2

(12) United States Patent
Womack et al.

(10) Patent No.: US 12,260,310 B2
(45) Date of Patent: Mar. 25, 2025

(54) SYSTEMS AND METHODS FOR TRAINING AND EXECUTING A MACHINE LEARNING MODEL FOR ANALYZING AN ELECTRONIC DATABASE

(71) Applicant: Capital One Services, LLC, McLean, VA (US)

(72) Inventors: Gena Womack, McLean, VA (US); Tania Cruz Morales, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 755 days.

(21) Appl. No.: 17/643,904

(22) Filed: Dec. 13, 2021

(65) Prior Publication Data

US 2023/0186171 A1    Jun. 15, 2023

(51) Int. Cl.
*G06N 20/20*    (2019.01)
*G06F 3/0483*    (2013.01)
(Continued)

(52) U.S. Cl.
CPC ........... *G06N 20/20* (2019.01); *G06F 3/0483* (2013.01); *G06F 3/04842* (2013.01); *G06F 16/2379* (2019.01)

(58) Field of Classification Search
CPC ... G06N 20/20; G06F 16/2379; G06F 3/0483; G06F 3/04842
See application file for complete search history.

(56) References Cited

U.S. PATENT DOCUMENTS 10,735,212 B1 *  8/2020  Zarakas ................ G06N 3/084
10,937,004 B2    3/2021  Comerford et al.
(Continued)

FOREIGN PATENT DOCUMENTS

JP    63-5711 B2    2/1988

OTHER PUBLICATIONS

Pookandy, Jaseem. "Exploring the role of AI-orchestrated workflow automation in cloud CRM to enhance operational efficiency through intelligent task management." International Journal of Computer Science and Information Technology Research (IJCSITR) 1.1 (2020): 15-31. (Year: 2020).*

(Continued)

*Primary Examiner* — Shahid K Khan
(74) *Attorney, Agent, or Firm* — Bookoff McAndrews, PLLC

(57) ABSTRACT

A method of for analyzing data using machine learning models comprising: receiving data associated with a request to add a new occasion to an electronic database, wherein: the electronic database includes a plurality of occasions; a portion of the plurality of occasions is associated with a timing value and a substance value; the electronic database is associated with a first progress value; and the data associated with the request to add the new occasion is at least partially automatically generated by a first trained machine learning model; receiving data associated with the new occasion; predicting, by a second trained machine learning model, a timing value and a substance value for the new occasion; calculating a second progress value based on the timing value and the substance value for the new occasion; and causing a graphical user interface to display a notification to add the new occasion to the electronic database.

20 Claims, 8 Drawing Sheets

(51) Int. Cl.
  *G06F 3/04842* (2022.01)
  *G06F 16/23* (2019.01)

(56) References Cited

U.S. PATENT DOCUMENTS

| | | | |
|---|---|---|---|
| 10,942,061 | B2 | 3/2021 | Chen et al. |
| 11,792,028 | B1* | 10/2023 | Sylvester ............ H04L 12/1827 709/204 |
| 2006/0233346 | A1* | 10/2006 | McIlwaine .......... H04M 3/5175 379/265.02 |
| 2015/0006221 | A1* | 1/2015 | Mermelstein ...... G06Q 10/1093 705/7.19 |
| 2016/0050168 | A1* | 2/2016 | Zutphen .............. G06F 3/04817 715/752 |
| 2016/0335572 | A1* | 11/2016 | Bennett ................ G06Q 10/107 |
| 2016/0350721 | A1* | 12/2016 | Comerford ........... H04L 67/306 |
| 2017/0061956 | A1* | 3/2017 | Sarikaya .................. G06N 5/01 |
| 2017/0178080 | A1* | 6/2017 | Abebe ................... G06F 16/383 |
| 2017/0193349 | A1* | 7/2017 | Jothilingam ........... G06N 20/20 |
| 2019/0065033 | A1* | 2/2019 | Kulkarni ................. H04L 51/42 |
| 2019/0129749 | A1* | 5/2019 | White .................. G06Q 10/109 |
| 2019/0147367 | A1* | 5/2019 | Bellamy ................ G06N 20/00 706/12 |
| 2019/0347621 | A1* | 11/2019 | White ....................... G06N 7/01 |
| 2020/0005248 | A1* | 1/2020 | Gerzi ................. G06Q 10/1097 |
| 2020/0110623 | A1* | 4/2020 | Vangala ................ G06Q 10/06 |
| 2020/0234250 | A1* | 7/2020 | Farivar .............. G06Q 10/1095 |
| 2020/0403817 | A1* | 12/2020 | Daredia ................ G06F 16/483 |
| 2020/0410453 | A1* | 12/2020 | Nalliah .................... G06F 16/93 |
| 2021/0099317 | A1* | 4/2021 | Hilleli .................... G06F 40/295 |
| 2021/0280195 | A1* | 9/2021 | Srinivasan .............. G06F 3/167 |
| 2021/0297376 | A1* | 9/2021 | Rafferty .................. G06N 3/04 |
| 2023/0136309 | A1* | 5/2023 | Xiao-Devins ........... H04L 51/56 705/7.13 |
| 2024/0330578 | A1* | 10/2024 | Dotan-Cohen ....... G06F 40/279 |

OTHER PUBLICATIONS

Cranshaw, Justin, et al. "Calendar. help: Designing a workflow-based scheduling agent with humans in the loop." Proceedings of the 2017 CHI Conference on Human Factors in Computing Systems. 2017. (Year: 2017).*

Gershman, Amir, et al. "Scheduling meetings by agents." Proc. 7th International Conference on Practice and Theory of Automated Timetabling (PATAT 2008). Montreal (Aug. 2008). 2008. (Year: 2008).*

* cited by examiner

FIG. 7

| | IMPORTANCE (5=MI) | URGENCY RANK (5=MU) | AREA |
|---|---|---|---|
| | 1 | -1 | APPROVE NS AUDITS |
| | 1 | 2 | SLEEP & EXERCISE |
| | 1 | -1 | DELIVER PLAN |
| | 1 | 2 | ADP |
| | 2 | 1 | FREDRICK, PETER, JULIA |
| | 1 | -2 | REGULATOR INTERACTIONS |
| | 1 | -1 | CORE |
| | -1 | -1 | EC GOVERNANCE |
| | -2 | -1 | AUDIT CULTURE DIB |
| | 1 | -1 | LEADER COMMUNICATIONS |
| | 2 | 2 | NEXT GM ROLE, BOD INTERACTION, BC RELATIONSHIPS |
| | 1 | 1 | STRATEGY IMPERATIVES (GM) |
| | -2 | 1 | FIND BOD |
| | 1 | -1 | ALL - COMMS & ONBOARD |
| | -1 | 2 | TECH REBUILD |
| | -2 | 1 | VOICES |
| | 1 | 1 | MAKE LT SUSTAINABLE |
| | -2 | 1 | COMMONWEALTH |
| | 1 | 1 | TM &PM |

SYSTEMS AND METHODS FOR TRAINING AND EXECUTING A MACHINE LEARNING MODEL FOR ANALYZING AN ELECTRONIC DATABASE

TECHNICAL FIELD

Various embodiments of this disclosure relate generally to training and executing machine learning based techniques for analyzing data in a database, and, more particularly, to systems and methods for analyzing occasion data and recommending occasions to be added to a database that includes data expressed as a virtual calendar, schedule, or the like.

BACKGROUND

Virtual calendars are an important aspect of many business enterprises. Many enterprises typically have specially trained administrative assistants who manage and coordinate virtual calendars, and often make strategic scheduling decisions on behalf of senior executives and leadership. Larger enterprises may have hundreds or even thousands of administrative assistants across different business sectors. Calendaring software to assist employees and administrative assistants with meeting scheduling is readily available, such as Google Calendar available online from Google Inc. of Mountain View, California. Despite existing software tools and the help of administrative assistants, it is estimated that businesses still lose approximately $37 billion dollars a year due to ineffective or unnecessary meetings that fail to advance business goals. This is due to both the lost time of participants as well as the increased computing resources that are required to process this excessive and/or ineffective numbers of meetings.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

The systems and methods of the present disclosure may solve one or more of the problems set forth above and/or other problems in the art. The scope of the current disclosure, however, is defined by the attached claims, and not by the ability to solve any specific problem.

SUMMARY OF THE DISCLOSURE

According to certain aspects of the disclosure, methods and systems are disclosed for training and using machine learning models to perform activities such as analyzing occasion data and recommending occasions to be added to a database. Each of the examples disclosed herein may include one or more of the features described in connection with any of the other disclosed examples.

There is a technical need to analyze prior calendar data across an enterprise in order to find correlations between calendared meetings and progress against personal and business priorities. There is further a need for a scalable technological solution to aid employees and administrative assistants in scheduling meetings in an efficient and cost effective manner. There is also a need for an improved method to organize and display this information on a graphical user interface ("GUI") to improve user convenience. The systems and methods disclosed herein provide a technical solution to one or more of these and other technical problems associated with analyzing occasion data and/or training a machine learning engine to recommend occasions to be added to an electronic database in order to, for example, achieve objectives and improve the efficiency of electronic calendar software. Aspects of this disclosure may result in a better analysis of calendar data stored on databases, improved computing efficiency due to a reduction in resources needed to schedule ineffective events, and/or a more scalable technical implementation and presentation of data that will enhance existing calendar software.

In one aspect, an exemplary embodiment of a computer-implemented method for analyzing data using machine learning models may include: receiving data associated with a request to add a new occasion to an electronic database, wherein: the electronic database includes a plurality of occasions; at least a portion of the plurality of occasions is associated with a timing value and a substance value; the electronic database is associated with a first progress value determined based on the timing values and the substance values of the plurality of occasions; wherein the data associated with the request to add the new occasion is at least partially automatically generated by a first trained machine learning model, wherein the first trained machine learning model is trained based on (i) training occasion data that includes information regarding one or more occasions associated with one or more electronic databases and (ii) progress value data including a progress value for each of the one or more electronic databases to learn relationships between the training occasion data and the progress value data, such that the first trained machine learning model is configured to use the learned relationships to generate a new occasion that will result in a second progress value that exceeds the first progress value; receiving data associated with the new occasion; predicting, by a second trained machine learning model, a timing value and a substance value for the new occasion, wherein the second trained machine learning model is trained, based on (i) training occasion data that includes information regarding one or more occasions associated with one or more electronic databases and (ii) training value data that includes a prior timing value and substance value for each of the one or more occasions, to learn relationships between the training occasion data and the training value data, such that the second trained machine learning model is configured to use the learned relationships to determine the substance value and timing value for the new occasion in response to input of the data associated with a request to add a new occasion to the electronic database and data associated with the new occasion; calculating a second progress value for the electronic database based on the timing value and the substance value for the new occasion; and upon determining that the second progress value exceeds the first progress value, causing a graphical user interface to display a notification to add the new occasion to the electronic database In a further aspect, an exemplary embodiment of a computer-implemented method for analyzing occasion data and recommending occasions may include: a memory storing instructions; and a processor operatively connected to the memory and configured to execute the instruction to perform operations. The operations may include: receiving data associated with a request to add a new occasion to an electronic database, wherein: the electronic database includes a plurality of occasions; at least a portion of the plurality of occasions is associated with a timing value and a substance value; and the electronic database is associated with a first progress value determined based on the timing values and the substance values of the plurality of occasions;

wherein the data associated with the request to add the new occasion is at least partially generated automatically by a first trained machine learning model, wherein the first trained machine learning model is trained based on (i) training occasion data that includes information regarding one or more occasions associated with one or more electronic databases and (ii) progress value data including a progress value for each of the one or more electronic databases to learn relationships between the training occasion data and the progress value data, such that the first trained machine learning model is configured to use the learned relationships to generate a new occasion that will result in a second progress value that exceeds the first progress value; receiving data associated with the new occasion; predicting, by a second trained machine learning model, a timing value and a substance value for the new occasion, wherein the second trained machine learning model is trained, based on (i) training occasion data that includes information regarding one or more occasions associated with one or more electronic databases and (ii) training value data that includes a prior timing value and substance value for each of the one or more occasions, to learn relationships between the training occasion data and the training value data, such that the second trained machine learning model is configured to use the learned relationships to determine the substance value and timing value for the new occasion in response to input of the data associated with a request to add a new occasion to the electronic database and data associated with the new occasion; calculating a second progress value for the electronic database based on the timing value and the substance value for the new occasion; and upon determining that the second progress value exceeds the first progress value, causing a graphical user interface to display a notification to add the new occasion to the electronic database.

In another aspect, an exemplary embodiment of a system for training a machine-learning model for analyzing occasion data and recommending an occasion may include: receiving, by one or more processors, data associated with a request to add a new occasion to an electronic database, wherein: the electronic database includes a plurality of occasions; at least a portion of the plurality of occasions is associated with a timing value and a substance value; and the electronic database is associated with a first progress value determined based on the timing values and the substance values of the plurality of occasions; receiving, by the one or more processors, data associated with the new occasion; training, by the one or more processors, a machine learning model to predict a timing value and a substance value for the new occasion, wherein the machine learning model is trained, based on (i) training occasion data that includes information regarding one or more occasions associated with one or more electronic databases and (ii) training value data that includes a prior timing value and substance value for each of the one or more occasions, to learn relationships between the training occasion data and the training value data, such that the machine learning model is configured to use the learned relationships to determine the substance value and timing value for the new occasion in response to input of the data associated with a request to add a new occasion to the electronic database and data associated with the new occasion; receiving, by the one or more processors, user input data indicating the substance value and the timing value associated with one or more of the plurality of occasions; tuning, by the one or more processors, the machine learning model to generate a tuned machine learning model by using (i) the user input data, and (ii) data associated with the one or more of the plurality of occasions, such that the learned relationships are updated based on the user input data and the data associated with the one or more of the plurality of occasions; predicting, by the one or more processors, a timing value and a substance value for the new occasion; calculating, by the one or more processors, a second progress value for the electronic database based on the timing value and the substance value for the new occasion; and upon determining that the second progress value exceeds the first progress value, causing, by the one or more processors, a graphical user interface to display a notification to add the new occasion to the electronic database.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 depicts an exemplary GUI including an electronic calendar with a selectable manage priorities tab, according to one or more embodiments.

DETAILED DESCRIPTION

Figure 1:
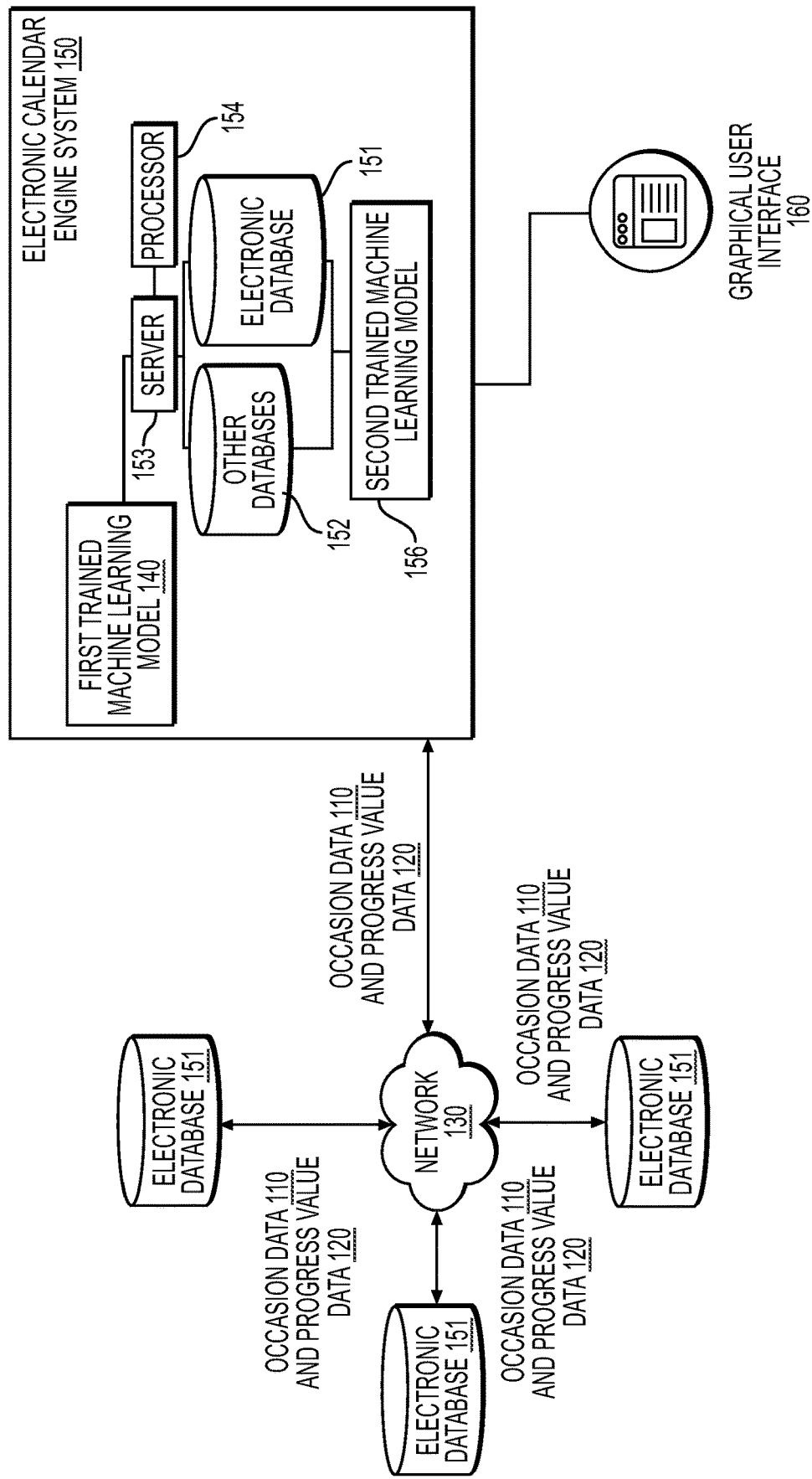
FIG. 1 depicts an exemplary environment for using a machine-learning model to analyze data and recommend occasions, according to one or more embodiments.

According to certain aspects of the disclosure, methods and systems are disclosed for analyzing data using machine learning, e.g., analyzing data relating to new occasions (e.g., events, meetings, objectives, and so forth) stored on an electronic database with data expressed as a virtual electronic calendar or schedule. There is a need for a scalable technical method for analyzing prior calendar data across an enterprise in order to find correlations between calendared meetings and progress against personal and business priorities. There is further a need to automate processes to assist executive administrators in both evaluating and recommending meetings that achieve business goals or closely align with other calendars of successful people within the enterprise. However, conventional techniques may not be suitable. For example, conventional techniques may not: provide for an ability to automatically suggest new occasions to add to a database using a first machine model trained based on training occasion data and progress value data; predict, using a second machine learning model trained based on database information and training value data that includes prior timing values and substance values for prior occasions, a timing and a substance value for a new event; or provide for calculating a second progress value and displaying a notification to add a new event to an electronic database based on the progress value. Accordingly, improvements in technology relating to analyzing calendar data stored in one or more databases are needed.

As will be discussed in more detail below, in various embodiments, systems and methods are described for using machine learning to, for example, analyze data on an electronic database and/or suggest new occasions to add to an electronic database. For example, by training a machine-learning model, e.g., via supervised or semi-supervised learning, to learn associations between (i) training occasion (e.g., event) data that includes information regarding one or more occasions associated with one or more electronic databases and (ii) training value data that includes a prior timing value and substance value for each of the one or more occasions, the trained machine-learning model may be usable to analyze event requests and predict whether adding the events to an electronic calendar will result in an increased progress score for the electronic calendar. As another example, by training another machine-learning model to learn associations between training occasion data and progress value data, the additional trained machine-learning model may be usable to generate and suggest event requests that will increase the progress score for the electronic calendar.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software. As used herein, terms such as "electronic database" or the like generally encompass a structured set of data held in a computer and which contains data that may be expressed as an electronic calendars, schedule, or the like. As used herein, terms such as "occasion" or the like generally encompass representations of events, meetings, objectives, goals, work requirements, or other information that may be represented by data on a database, for example, a scheduled meeting in the context of electronic calendar software.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case with virtual (e.g., electronic) calendar software, a trained machine learning model may be used to evaluate meeting scheduling requests for a virtual calendar for a user, and determine or recommend whether the requested meeting should be scheduled based on whether that meeting will improve a progress score for the electronic calendar. In another use case, another trained machine learning model may be used to automatically generate and suggest meetings for a virtual calendar that would improve a progress value for the virtual calendar. The other trained machine learning model may, for example, propose attendees, subject matter, and/or an amount of time for the meeting.

In another exemplary use case with virtual calendar software, a machine-learning model may be trained to evaluate meeting scheduling requests based on training calendar event data and training value data that includes timing values and substance values for previously scheduled events. Another machine learning model may be trained to automatically generate and suggest meetings based on training event data from other virtual calendars and corresponding progress value data for those virtual calendars.

In yet another exemplary use case with virtual calendar software, a machine learning model may be trained to predict a timing value and a substance value for a meeting scheduling request based on training calendar event data and training value data that includes timing values and substance values for previously scheduled events to generate a trained machine learning model. The trained machine learning model may further be tuned to generate a tuned machine learning model based on user input data indicating substance and timing values associated with one or more occasions and data associated with the one or more occasions.

While several of the examples above involve occasions (for example, calendar events), it should be understood that techniques according to this disclosure may be adapted to any suitable type of data or data structure expressed in a database. It should also be understood that the examples above are illustrative only. The techniques and technologies of this disclosure may be adapted to any suitable activity.

Presented below are various aspects of machine learning techniques that may be adapted to analyze occasion data. As will be discussed in more detail below, machine learning techniques adapted to evaluate and generate requests to add a new occasions to an electronic database may include one or more aspects according to this disclosure, e.g., a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

FIG. 1 depicts an example of an environment 100 that may be utilized with techniques presented herein. One or more electronic databases 151 and an electronic calendar engine system 150 may communicate across an electronic network 130. In some embodiments, the electronic calendar engine system 150 may comprise a server 153, an electronic database 151, one or more other databases 152, a first trained machine learning model 140, and a second trained machine learning model 156. The electronic calendar engine system 150 may be integrated with, or separate from (but connected to or otherwise in communication with), a GUI 160. The GUI 160 may be implemented on any device capable of visual or tactile presentation of data and images in a form intelligible to a user. In some embodiments, the GUI 160 may present information dynamically in a visual medium. In some other embodiments, the GUI 160 may support a tactile display (display that may be felt by the fingers—and intended for the visually impaired) of data and images. In some embodiments, the GUI 160 supporting a tactile display may further be audio-enabled, such that parameter elements are associated with one or more sounds (e.g. musical tones, filtered noises, recorded sound effects, synthesized speech, and the like), in order to further assist a visually impaired user utilizing the display. Non-limiting examples of the display on which the GUI 160 is implemented may include a cathode ray tube, a liquid crystal display, a light emitting display, a plasma display, etc. In some embodiments, the GUI 160 may also accept user inputs. In these embodiments, the GUI 160 may be implemented on a device that may include a touch screen where information may be entered by selecting one of multiple options presented on the display. Selecting an option may be accomplished using a mouse (as is well known in the art), or touching an area of the display. In some embodiments, GUI 160 may be implemented on two or more displays in communication with the electronic calendar engine system 150. As will be discussed in further detail below, an electronic calendar engine system 150 may communicate with one or more of the other components of the environment 100 across electronic network 130. The one or more electronic databases 151 may be associated with a user, e.g., a user associated with one or more of generating, training, or tuning a machine-learning model for generating, obtaining, or analyzing occasion (e.g., event or meeting) data, and/or generating occasion requests.

In some embodiments, the components of the environment 100 are associated with a common entity, e.g., a financial institution, transaction processor, merchant, business enterprise, or the like. In some embodiments, one or more of the components of the environment is associated with a different entity than another. The systems, devices and databases of the environment 100 may communicate in any arrangement. As will be discussed herein, systems and/or databases of the environment 100 may communicate in order to one or more of generate, train, or use a machine-learning model to analyze occasion data and generate occasion requests, among other activities.

The electronic database 151 may be configured to enable the user to access and/or interact with other systems in the environment 100. For example, the electronic database 151 may be connected to a computer system such as, for example, a desktop computer, a mobile device, a tablet, etc. In some embodiments, the electronic database 151 include one or more electronic application(s), e.g., a program, plugin, browser extension, etc., installed on a memory of the computer system connected to the electronic database 151. In some embodiments, the electronic application(s) may be associated with one or more of the other components in the environment 100. For example, the electronic application(s) may include one or more of system control software, system monitoring software, software development tools, scheduling software, communications software, data visualization software, virtual calendar software, etc.

The electronic database 151 may include a server system, an electronic medical data system, computer-readable memory such as a hard drive, flash drive, disk, etc. In some embodiments, the electronic database 151 includes and/or interacts with an application programming interface for exchanging data to other systems, e.g., one or more of the other components of the environment. The electronic database 151 may include and/or act as a repository or source for occasion data, for example, calendar event data, as discussed in more detail below.

In various embodiments, the electronic network 130 may be a wide area network ("WAN"), a local area network ("LAN"), personal area network ("PAN"), or the like. In some embodiments, electronic network 130 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the electronic calendar engine system 150 may one or more of (i) generate, store, train, or use one or more machine-learning models configured to analyze new occasion requests or suggest new occasions to add to an event calendar. The electronic calendar engine system 150 may include a machine-learning model and/or instructions associated with the machine-learning model, e.g., instructions for generating a machine-learning model, training the machine-learning model, using the machine-learning model etc. The electronic calendar engine system 150 may include instructions for retrieving occasion data, adjusting occasion data, e.g., based on the output of the machine-learning model, and/or operating the GUI 160 to output occasion data, e.g., as adjusted based on the machine-learning model. The electronic calendar engine system 150 may include training data, e.g., occasion data 110, and may include ground truth, e.g., progress value data 120.

In some embodiments, a system or device other than electronic calendar engine system 150 is used to generate and/or train the machine-learning model. For example, such a system may include instructions for generating the one or more machine-learning models, the training data and ground truth, and/or instructions for training the machine-learning model. A resulting trained-machine-learning model may then be provided to the electronic calendar engine system 150.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of a first machine-learning model may be configured to cause the machine-learning model to learn associations between training occasion data that includes information regarding one or more occasions associated with one or more electronic databases and progress value data including a progress value for each of one or more electronic databases to learn relationships between the training occasion data and the progress value data, such that the trained machine-learning model is configured to determine an output to generate a new occasion that will result in a second progress value that exceeds the first progress value based on the learned associations. The training of a second machine-learning model may be configured to cause the machine-learning model to learn associations between training occasion data that includes information regarding one or more occasions associated with one or more electronic databases and training value data that includes a prior timing value and substance value for each of the one or more occasions data, such that the trained machine-learning model is configured to determine an output substance value and timing value for a new occasion in response to the input of data associated with a request to add a new occasion to the electronic database based on the learned associations.

Although depicted as separate components in FIG. 1, it should be understood that a component or a portion of a component in the environment 100 may, in some embodiments, be integrated with or incorporated into one or more other components. For example, a portion of the GUI 160 may be integrated into electronic database 151 or the like. In another example, the electronic calendar engine system 150 may be integrated with an electronic database 151. In some embodiments, operations or aspects of one or more of the components discussed above may be distributed amongst one or more other components. Any suitable arrangement and/or integration of the various systems and devices of the environment 100 may be used.

Further aspects of the machine-learning model and/or how it may be utilized to generate and/or analyze requests to add a new occasion to a database are discussed in further detail in the methods below. In the following methods, various acts may be described as performed or executed by a component from FIG. 1, such as the electronic calendar engine system 150, the electronic database 151, or components thereof. However, it should be understood that in various embodiments, various components of the environment 100 discussed above may execute instructions or perform acts including the acts discussed below. An act performed by a device or system may be considered to be performed by a processor, actuator, or the like associated with that device or system. Further, it should be understood that in various embodiments, various steps may be added, omitted, and/or rearranged in any suitable manner.

Figure 2:
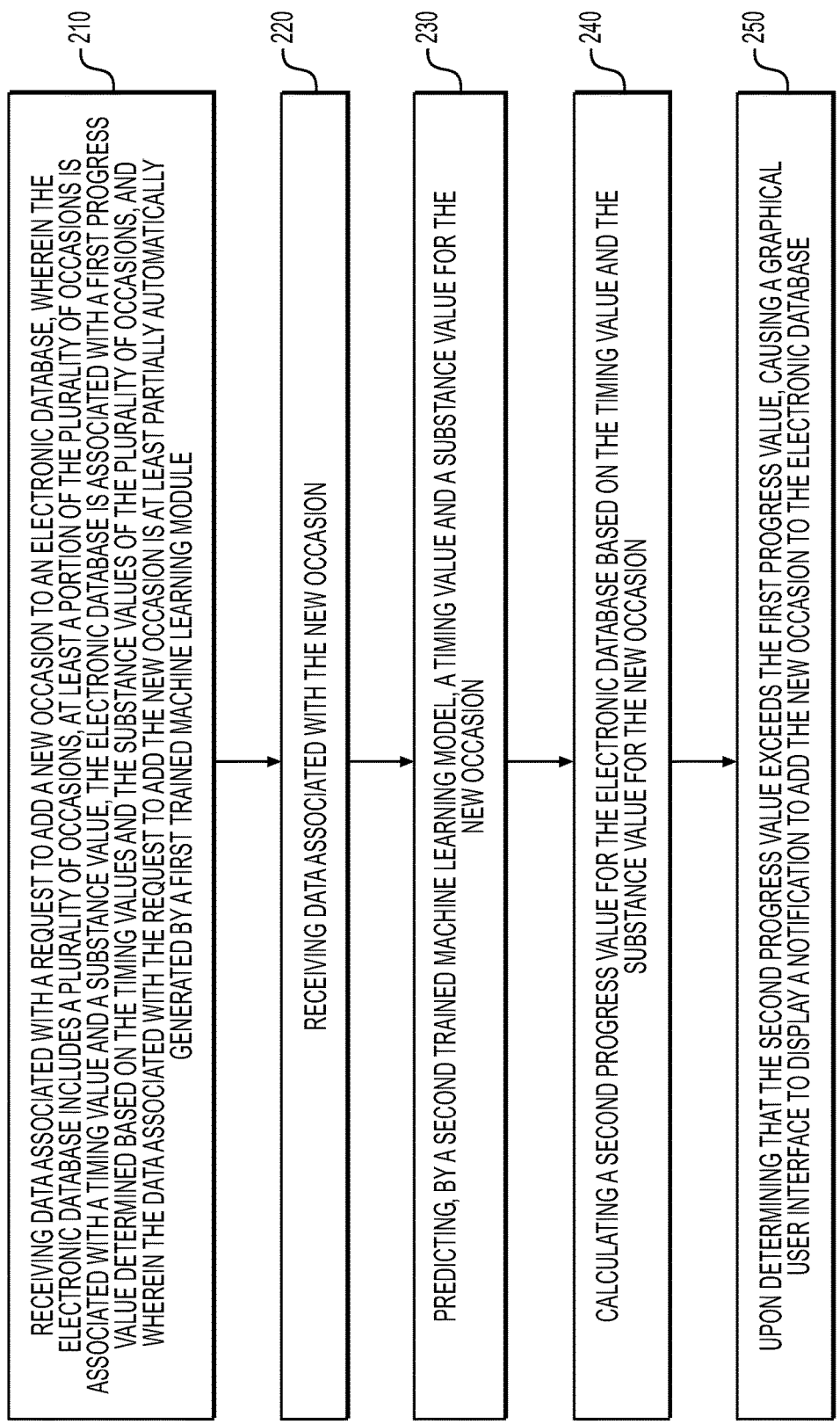
FIG. 2 depicts a flowchart of an exemplary computer-implemented method of using a trained machine-learning model to analyze data in a database to evaluate new occasions for an electronic database, according to one or more embodiments.

FIG. 2 illustrates an exemplary process 200 for using a trained machine-learning model to analyze data in a database to evaluate new occasions for an electronic database, such as in the various examples discussed above. At step 210, the electronic calendar engine system 150 may receive data associated with a request to add a new occasion to an electronic database 151. The electronic database 151 may include a plurality of occasions, for example, an electronic calendar including a plurality of scheduled meetings. In some embodiments, a portion of the plurality of occasions is associated with a timing (e.g., urgency) value and a substance (e.g., importance) value. In some embodiments, the timing value may be a value between −2 and +2. For example, a timing value may be one of −2, −1, 1, or 2, where −2 refers to a less urgent occasion (e.g., an occasion reflecting a task or meeting that need not be addressed immediately) while +2 refers to a more urgent occasion (e.g. an occasion that must be addressed or completed immediately). Other values may be used. In some embodiments, the substance value may also be a value between −2 and +2. For example, a substance value may be one of −2, −1, 1, or 2, where a −2 substance value may refer to a less important occasion (for example, an occasion that is not critical to a business or personal target objective) while a +2 substance value may refer to a more important occasion (for example, an occasion that is critical or high priority).

The electronic database 151 may further be associated with a first progress value determined based on the timing values and the substance values of the plurality of occasions included in the electronic database 151. For example, in some embodiments, a first progress value may be determined by adding together all of the substance values and all of the timing values. In other embodiments, a first progress value may be calculated based on weights associated with occurrences depending on the timing and substance values associated with that occurrence. For example, occurrences with a substance value of +2 and a timing value of +2 may receive higher weight value and have a greater positive impact on the progress value. Similarly, events with a substance value of +1 and a timing value of +1 may receive a lower weight value and have a lessened impact on the progress value. In other embodiments, the progress value may be determined based on the total time spent on occasions relative to the total time spent. For example, the total time spent on occurrences with a substance value of +2 and a timing value of +2 during a week might be 10 hours, while the total amount of relevant work time might be 40 hours. A progress score could thus be calculated as 10/40× 100%=25%.

In another example involving a typical 40 hour work week, a progress value might be calculated based on a percentage amount of time dedicated to occasions with specific substance and timing values. For example, occasions with high timing and substance values might be categorized as "Do First" tasks that must be completed. Occasions with high timing but low substance values might be categorized as "Delegate" tasks that can be given to others. Occasions with low timing but high substance values might be categorized as "Schedule" tasks that should be planned but are not urgent to complete immediately. Occasions with low timing and low substance values might be categorized as "Don't Do" tasks which may not need to be completed or scheduled at all. In some embodiments, a target might be set to aim to have a set percentage of time dedicated to tasks in each of the aforementioned categories. For example, 20% (8 hours) for "Do First" occasions, 50% (20 hours) for "Schedule" occasions, 15% (6 hours) for "Delegate" tasks, 0% (0 hours) for "Don't Do" occasions, and 6 hours (15%) for occasions that are not categorized. Thus, a progress value may be determined, for example, based on the percentage of time spent on occasions falling into one or more of the categories described above. The progress value may further be based on the percentage of time spent on these occasions relative to the target goal percentages.

In another embodiment, a progress value may further be determined based on the subject matter (e.g., subject data) associated with the occurrences. For example, the first progress value may be determined by evaluating the amount of time spent on a critical activity versus the total amount of time worked. For example, a monthly goal of 50 hours of occasions for an important project may be set. The progress score could be the number of scheduled occasions to date schedule divided by the goal×100%. For example, if in a month only 25 hours of occasions are scheduled thus far, the first progress score might be 25/50*100%=50%.

In some embodiments, the data associated with a request to add a new occasion to an electronic database 151 may be automatically generated by a first trained machine learning model trained according to one or more embodiments discussed above. The first trained machine learning model may be trained based on training occasion data that includes information regarding one or more occasions associated with one or more electronic databases and progress value data including a progress value for each of the one or more electronic databases to learn relationships between the training occasion data and the progress value data, such that the first trained machine learning model is configured to use the learned relationships to generate a new occasion that will result in a second progress value that exceeds the first progress value. For example, the trained machine learning model, based on prior events associated with the electronic calendar along with corresponding progress scores associated with the addition of those events to the electronic calendar, may generate a calendar event that would increase the progress score. For example, the trained machine learning model may suggest subject data for the event, attendees to invite for the event, a time and location for the event. A subject data for the event could be, for example, a particular project, a category of events, a topic, or some other purpose that is likely to improve the progress score for the electronic calendar. While a single progress score is discussed here, there may be multiple progress scores for a particular electronic calendar. In some embodiments, the data associated with the request to add the new occasion may at least be partially received by the GUI 160. For example, in the context of an electronic calendar, a user may input a request to generate an event, and the trained machine learning model will propose a new event for the electronic calendar as explained above. In another example, a user may input a request to optimize the electronic calendar, and the trained machine learning model may propose to add new events (or remove events from the calendar) as explained above. In some embodiments, the request for an event may be user generated. For example, a user may input a proposed event, including for example naming attendees, subject matter, and a time, and the trained machine learning model may then analyze the event and propose to add, remove, or modify the event in order to improve one or more progress scores. In some embodiments, a proposed event may be generated by another user associated with a separate electronic calendar, for example, an invitation to schedule an event sent via software scheduling software. In this manner, the trained machine learning model may analyze the event proposed by another user and make a recommendation as described above.

At step 220, the electronic calendar engine system 150 may receive data associated with the new occasion. In an example, the request to add a new occasion may be in the form of an electronic calendar invitation to attend an event at a specified time and location. The data associated with the new occasion may include one or more of attendee data, time data, location data, and subject data. For example, where the new occasion is a calendar invite, the data associated with the new occasion may be the persons invited to the event, the time the event is proposed to be scheduled, the location for the event, and the subject matter of the event. The subject data may include a purpose or goal for the occasion. In some embodiments, the occasion may be a meeting. The occasion in some embodiments may also be time set-aside to work on a project, where no attendees are included. The subject data may also be personal or other goals or objectives unrelated to a business objective. Other data is also contemplated, for example, prior history data. For example, if the requested event was previously rejected one or more times, this information may play a role in decision-making as discussed further herein. In some embodiments, the trained machine learning model generates both the request to add a new event as well as generate data for the event (for example, proposed attendees, times, and/or subject matter). In some embodiments, the trained machine learning model may propose an event and prompt a user for additional input. For example the trained machine learning model may propose an event subject matter, and then prompt the user to input or select a time and/or attendees.

At step 230, the electronic calendar engine system 150 may predict a timing value and a substance value for the new occasion using a second trained machine learning model trained according to the principles described above. The second trained machine learning model may be trained based on training occasion data that includes information regarding one or more occasions associated with one or more electronic databases and training value data that includes a prior timing value and substance value for each of the one or more occasions, to learn relationships between the training occasion data and the training value data, such that the second trained machine learning model is configured to use the learned relationships to determine the substance value and timing value for the new occasion in response to input of the data associated with a request to add a new occasion to the electronic database and data associated with the new occasion. In some embodiments, the training occasion data and training value data may be obtained from occasions stored on an electronic database 151. In other embodiments, the training occasion data and training value data may be obtained and compiled from multiple electronic databases as shown in FIG. 1.

At step 240, the electronic calendar engine system 150 may calculate a second progress value for the electronic database 151 based on the timing value and the substance value for the new occasion. The second progress value for the electronic database may be calculated as described above with respect to step 210. Then at step 250, the electronic calendar engine system 150 may determine whether or not the second progress value for the electronic database 151 exceeds the first progress value. Upon determining that the second progress value exceeds the first progress value, the electronic calendar engine system 150 may cause a GUI 160 to display a notification to add the new occasion to the electronic database. This notification may be in the form of a pop-up notification on the screen, a push notification to a mobile device, an audible notification, or any other type of notification sent to a user device or displayed on a screen as described above with respect to FIG. 1. In some embodiments, if the electronic calendar engine system 150 determines that the second progress value does not exceed the first progress value, the electronic calendar engine system 150 may automatically decline the request to add the new occasion to the electronic database. In some embodiments, the electronic calendar engine system 150 may schedule or remove events automatically without notifying a user or prompting the user for input.

In some embodiments, after the electronic calendar engine system 150 determines that the second progress value exceeds the first progress value, the electronic calendar engine system 150 may not automatically add the occasion or generate a notification to add the occasion to the electronic database 151. Instead, the electronic calendar engine system 150 may generate a coverage value based on attendee data for the new occasion. A coverage value as used herein indicates whether there are a sufficient number of people in attendance at a meeting, such that additional attendees are not necessary. For example, a senior officer may not need to attend an event if the assistant to that senior officer or another leader on their team will already be attending. For example, in some embodiments, a coverage value may be a value from 0-10, where 0 means there is no coverage for an event and 10 means there is full coverage for an event. Then, the electronic calendar engine system 150 may determine whether the coverage value exceeds a predetermined threshold. Upon determining that the coverage value does not exceed a predetermined threshold, the electronic calendar engine system 150 may cause GUI 160 to display a notification to decline adding the new occasion to the electronic database. As an example, for certain occasions or meetings, not all participants need to be present; for example, only one or two people on a team might need to be present. In this scenario, having more than two people may result in efficiencies and lost time. As a result, even if attending the meeting might improve a progress value for a particular electronic calendar (for example, the meeting might be relevant to an important objective), the electronic calendar engine system 150 would recommend declining the meeting or automatically decline the meeting because it would be redundant due to the presence of other attendees. In this way, a technical solution is provided for automatically evaluating and accepting or declining meetings that leverages data analytics to reduce computer resource usage and improve workplace efficiency. In some embodiments, upon determining that the coverage score exceeds a threshold and declining the meeting, the electronic calendar engine system 150 may further suggest a new meeting with the assistant or other senior leader that can attend the meeting (to provide coverage). In this manner, event and meeting scheduling may further be automated.

As explained above, decisioning may also be made based on other data associated with the request for the new occasion, for example, prior history data. For example, if the requested new occasion was previously rejected one or more times, this information may play a role in decision making. In some cases, if the same event was already rejected by the electronic calendar engine system 150 or by a user multiple times, this might be a factor in future decisioning. For example, the electronic calendar engine system 150 might display a pop-up notification on GUI 160 confirming whether the event should be rejected again and/or permanently rejected from future consideration. Additional embodiments are contemplated where the notification may be generated in part based on feedback from a user as explained above. For example, repeated rejection of an event by a user may be used to prompt notifications from the electronic calendar engine system 150.

Figure 3:
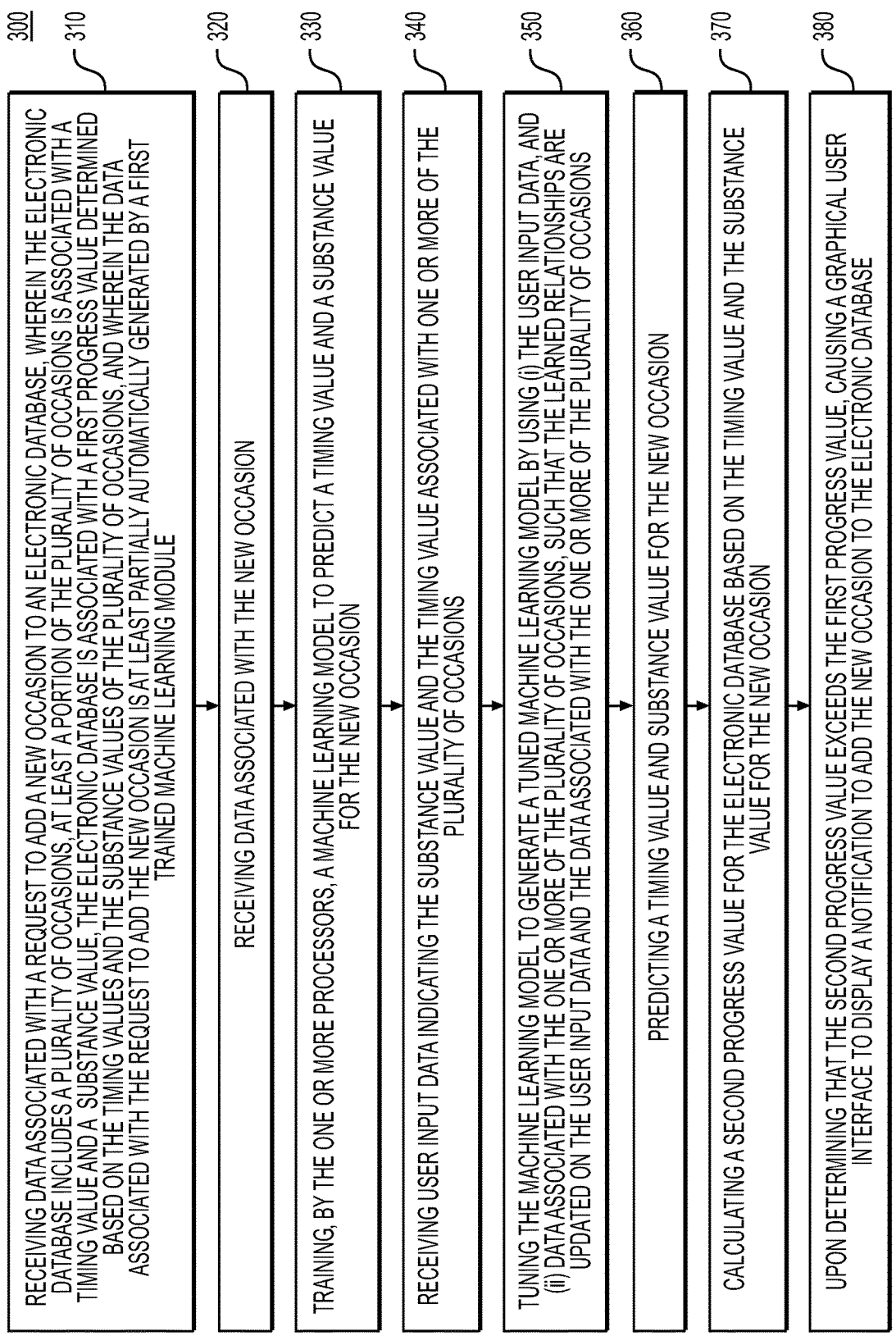
FIG. 3 depicts a flowchart of an exemplary computer-implemented method of training and tuning a machine-learning model to evaluate new occasions for an electronic database, according to one or more embodiments.

FIG. 3 illustrates an exemplary process 300 for training and tuning a machine learning model according to one or more embodiments discussed above. At step 310, the electronic calendar engine system 150 may receive data associated with a request to add a new occasion to an electronic database 151, e.g., as described above with respect to step 210 in FIG. 2. At step 320, the electronic calendar engine system 150 may receive data associated with the new occasion as described above with respect to step 220 in FIG. 2. At step 330, the electronic calendar engine system 150 may train a machine learning model, according to one or more embodiments discussed above, to predict a timing value and a substance value for the new occasion based on training occasion data that includes information regarding one or more occasions associated with one or more electronic databases and training value data that includes a prior timing value and substance value for each of the one or more occasions, to learn relationships between the training occasion data and the training value data, such that the machine learning model is configured to use the learned relationships to determine the substance value and timing value for the new occasion in response to input of the data associated with a request to add a new occasion to the electronic database and data associated with the new occasion.

At step 340, the electronic calendar engine system 150 may receive user input data indicating the substance value and the timing value associated with one or more of the plurality of occasions. In some embodiments, the user input data is generated in part via user input to GUI 160. At step 350, the electronic calendar engine system 150 may tune the trained machine learning model trained at step 330 to generate a tuned machine learning model by using (i) the user input data, and (ii) data associated with the one or more of the plurality of occasions, such that the learned relationships are updated based on the user input data and the data associated with the one or more of the plurality of occasions. In this manner, the prior machine learning model may be tuned to provide more accurate predictions based on user input data. For example, in the context of calendars, the machine learning model may be initially trained based on calendar data, occasions, and progress scores of other users in an enterprise. This machine learning model, according to these methods, could then be tuned to a specific user's calendar based in part on the user's inputs, resulting in a uniquely tailored machine learning model. This technical solution again results in an improved machine learning model that is better able to assist with analyzing vast amounts of data and recommending occasions for an electronic database 151. These technical methods are further scalable across large enterprises; by utilizing the methods disclosed herein, an initial base machine learning model can be generated based on user calendars across an entire enterprise, and then through machine transfer learning, a specific tuned machine learning model can be created for each electronic database 151 on the network.

At step 360, the electronic calendar engine system 150 may predict a timing value and a substance value for the new occasion as described above, e.g., with respect to step 230 in FIG. 2. At step 370, the electronic calendar engine system 150 may calculate a second progress value for the electronic database 151 based on the timing value and the substance value for the new occasion as described above with respect to step 240 in FIG. 2. At step 380, upon determining that the second progress value exceeds the first progress value, the electronic calendar engine system 150 may cause GUI 160 to display a notification to add the new occasion to the electronic database as described above at step 250 of FIG. 2.

Figure 4:
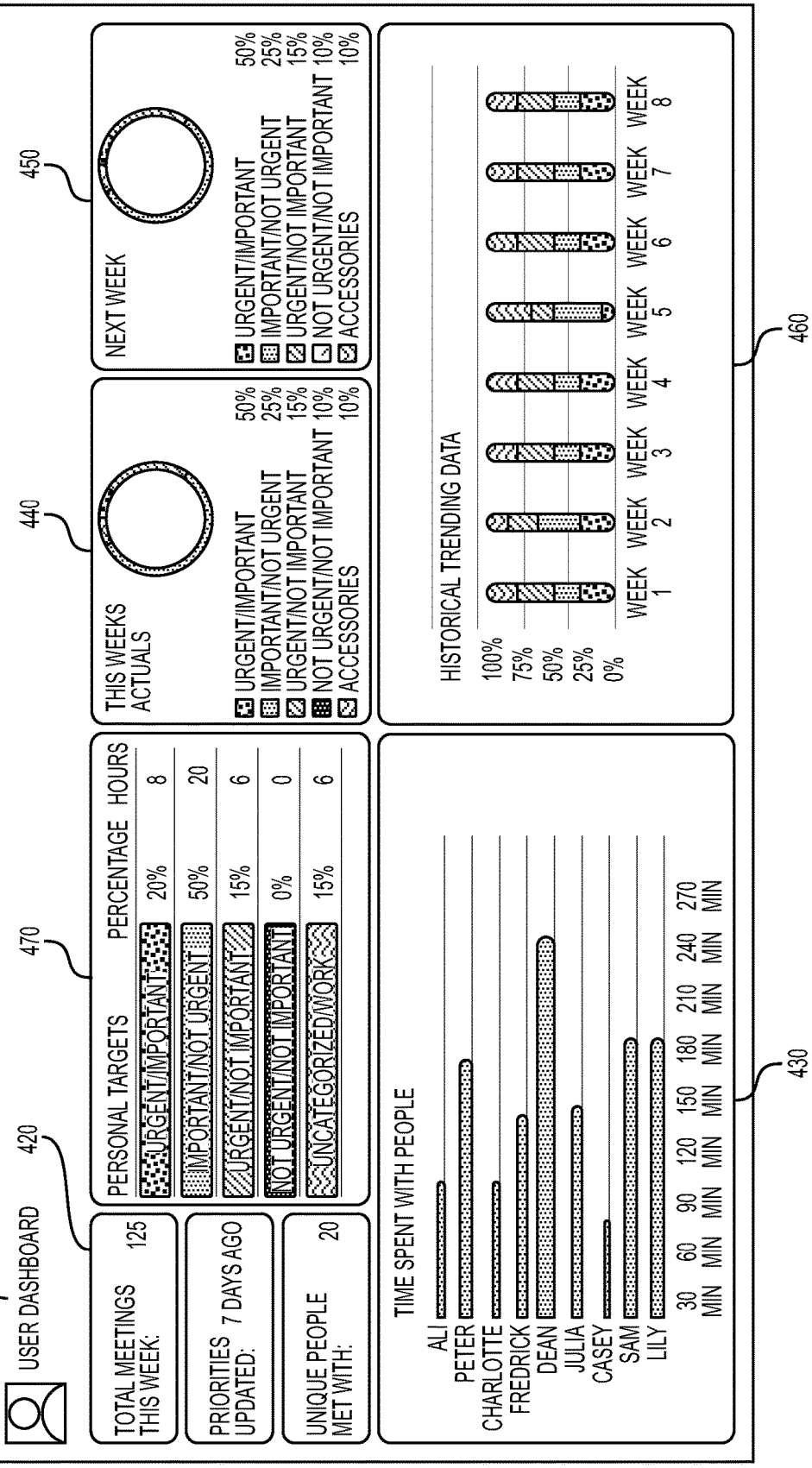
FIG. 4 depicts an exemplary GUI including a user dashboard, according to one or more embodiments.

FIG. 4 depicts an exemplary GUI 400 including a user dashboard 410, according to one or more embodiments. The user dashboard 410 may comprise an occasion summary graphic 420, an attendee graphic 430, actual progress graphic 440, a projected progress graphic 450, a historical trending data graphic 460, and a personal target graphic 470. The occasion summary graphic 420 may depict, for example, the total number of occasions or meetings scheduled over a specific time frame, for example, one week. While one week is used in this example, any time frame may be used, for example, a day, a portion of a day, biweekly, monthly, quarterly, semi-annually, annually, and so forth.

The occasion summary graphic 420 may comprise graphical depictions of aspects of occasion data and associated information related to user priorities or personal targets. For example, occasion summary graphics 420 may depict information related to when priorities or personal targets were last updated. For example, a user may, via user inputs to the GUI 160, determine or select one or more projects or meeting topics that may be high priority for the week for the purpose of measuring and determining progress values. The occasion summary graphic 420 may also provide other metrics of interest based on the occasion data, for example, the number of unique attendees associated with the attendee data for the occasions. Other data of note may also be presented via the occasion summary graphic 420 in order to maintain interest in the software as well as to assist the user with positive behavioral changes and decision-making.

The user dashboard 410 may also comprise an attendee graphic 430. Based on time data and attendee data associated with one or more occasions, a metric can be generated and represented by bar graph showing, for example, the amount of time spent with one or more different attendees over a time period. Displaying this information can assist users in forming future decision-making with respect to scheduling. For example, the attendee graphic 430 may include a recommendation for one or more attendees for a future meeting. This information may also be used to train one or more machine learning models as described above. The user dashboard 410 may further comprise an actual progress graphic 440, which may be a graphical depiction of occasion data and current week actual progress values, timing values, and/or substance values. The user dashboard 410 may further comprise a projected progress graphic 450, which may be a graphical depiction of occasion data and projected progress scores, timing values, substance values, and/or categories based on the occasions scheduled so far. The actual progress graphic 440 may depict the percentage of events that fall into one or more categories. In this example, the categories may be generated based on timing and importance values. For example, an occasion associated with a high timing value and a high substance value may be designated into the urgent/important category. An occasion with a low substance value but a high timing value may be designed into the urgent/not important category. An occasion with a high substance value but a low timing value may be designed into the important/not urgent category. An occasion with a low importance value and a low timing value may be designated into the not urgent/not important category. There further may be other categories that do not fall into the above, for example, an accessories category or "other" category for which fewer or no timing or substance or timing values are provided. The user dashboard 410 may further include a historical trending data graphic 460, which depicts historical occasion data and associated progress scores, timing values, and importance values.

The user dashboard 410 may also include a personal target graphic 470. The personal target graphic 470 may set targets which may be used to determine progress values. These personal targets can be created manually by a user, or it might be suggested by one or more machine learning models according to the principles described herein. In the example shown in FIG. 4, the personal target graphic 470 may indicate a progress goal for an electronic database in a typical forty (40 hour) work week. For example, a progress goal of 20% (8 hours) may be set for urgent and important occasions, a progress goal of 50% (20 hours) may be set for important but not urgent occasions, a progress goal of 15% (6 hours) may be set for not urgent/not important matters, and a progress goal or 5% (6 hours) may be set aside for uncategorized matters or work. The progress goals in personal target graphic 470 may be easily compared to the actual progress graphic 440, which provides a similar percentage breakdown of occasions scheduled on the calendar for the week. As shown in FIG. 4, the actual progress graphic 440 indicates that 50% of the occasion time for the current week is directed to urgent/important matters, which greatly exceeds the 20% target shown in personal target graphic 470. Next, the actual progress graphic 440 indicates that only 25% of occasion time is directed to important and not urgent matters. The actual progress graphic 440 also shows that 10% of the occasion time for the current week is associated with not urgent and not important matters. Using the principles described above with respect to FIGS. 1-3, the electronic calendar engine system 150 will likely suggest or approve a request for a new occasion that will result in an increase of the percentage of important and not urgent matters and a decrease in the percentage of occasions associated with urgent and important matters and a decrease in the percentage of time on occasions associated with not urgent and not important matters.

Figure 5:
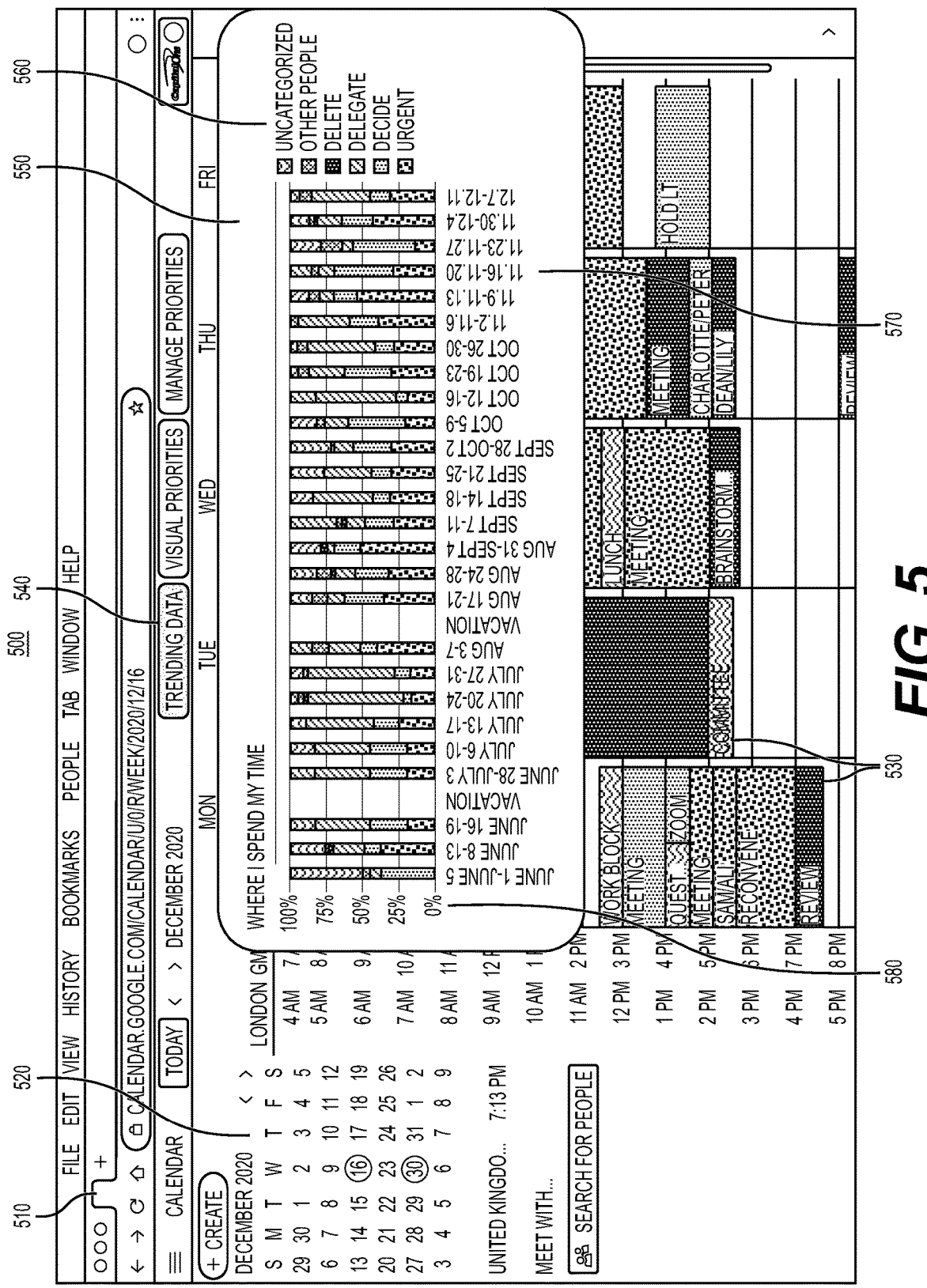
FIG. 5 depicts an exemplary GUI including an electronic calendar with a selectable trending data tab, according to one or more embodiments.

FIG. 5 depicts an example of a GUI 500 including an electronic calendar with a selectable trending data tab, according to one or more embodiments. The electronic calendar 510 may comprise a mini-calendar 520, calendar entries 530, a selectable trending data tab 540, a trending data pop-up 550, occasion categories 560, and graph that includes dates 570 and percentages 580. The mini-calendar 520 provides a month level view of an electronic calendar and makes it easier to navigate through the electronic calendar. The electronic calendar 510 may also have a number of selectable tabs, including for example a selectable trending data tab 540. Upon a user selection of the trending data tab, the GUI 500 displays a trending data pop-up 550. The trending data pop-up will display a graphical depiction of occasion data and progress values, timing values, and substance values. While a pop-up overlaying the electronic calendar is shown here, the trending data pop-up may be created in a separate tab, or may be generated on a separate screen or device separate from the electronic calendar. For example, as shown in FIG. 5, the occasions may be separated into categories and depicted. For example, "Delete" may refer to occasions that have low substance and low timing values. "Delegate" may refer to occasions that have high timing values but low substance values. "Urgent" may refer to occasions that have high substance values and high timing values. "Decide" may refer to occasions that have high substance values but low timing values. Other categories may be created that may not have substance or timing values attributed. The data may further be depicted graphically as shown in FIG. 5 with dates 570 along a horizontal axis and percentages 580 along a vertical axis. Thus, a user viewing the electronic database can more easily see the occasions scheduled at a given time organized according to importance and substance values. The presentation of this data in this format will further assist the user with future scheduling decisions by making it easier for them to understand prior trends and establish goals. While an exemplary electronic calendar is depicted, the disclosed embodiments are intended to work with many different types of electronic calendar software.

Figure 6:
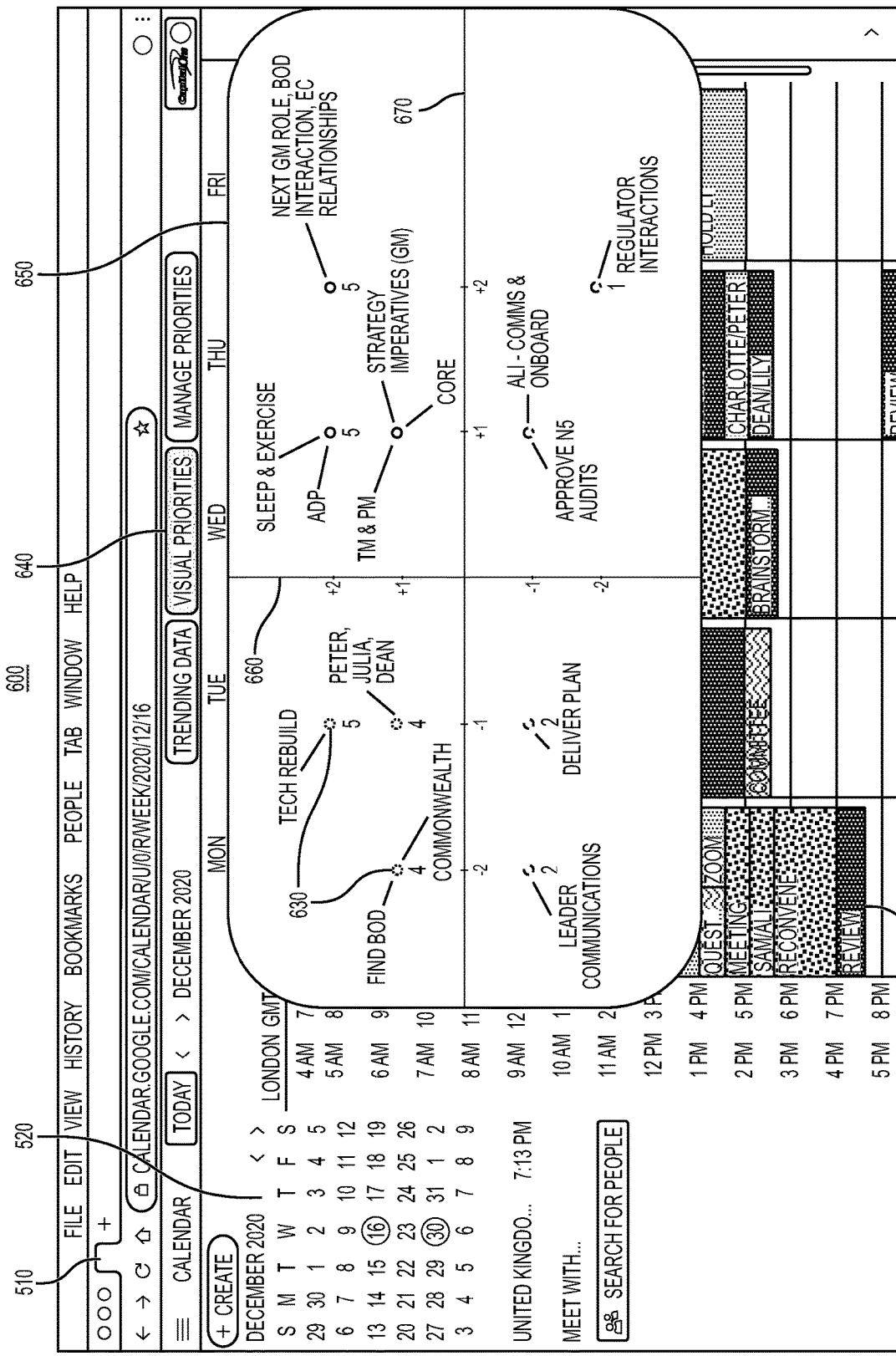
FIG. 6 depicts an exemplary GUI including an electronic calendar with a selectable visual priorities tab, according to one or more embodiments.

FIG. 6 depicts an example of a GUI 600 including an electronic calendar 510 with a selectable visual priorities tab, according to one or more embodiments. The electronic calendar 510 comprises a mini-calendar 520 and calendar entries 530. The electronic calendar 510 further comprises a selectable visual priorities tab 640. Upon selection of the visual priorities tab, a visual priorities pop-up screen 650 may be displayed. While a pop-up overlaying the electronic calendar is shown here, the visual priorities pop-up screen 650 may be presented in another browser tab, or on a separate window, screen or electronic device. The visual priorities pop-up screen 650 in some embodiments may display occasions 630 plotted on an x-y coordinate graph, with an x-axis 660 defined by substance values and a y-axis 670 defined by timing values. The occasions 630 may be plotted based on associated timing values and substance values. In one example, each occasion may be associated with a timing value of −2, −1, +1, or +2 and a substance value of −2, −1, +1, or +2 as previously described. For example, the occasion "tech rebuild" may have a substance value of +2 and a timing value of −1. Accordingly, "tech rebuild" could be plotted and depicted on the x-y graph at (−1, +2). Displaying the occasion data by the corresponding timing and substance values results in an improved interface resulting in a better visualization of calendar data that will enable a user's decisioning when scheduling and calendaring occasions on an electronic database.

FIG. 7 depicts an example of a GUI 700 including an electronic calendar with a manage priorities tab, according to one or more embodiments. The electronic calendar 510 comprises a mini-calendar 520 and calendar entries 530. The electronic calendar 510 further comprises a selectable manage priorities tab. In this example shown in FIG. 7, upon selection of the selectable manage priorities tab 740, a manage priorities pop-up window 750 is generated. Upon selection of the manage priorities tab, a manage priorities pop-up window 750 may be displayed. While a pop-up overlaying the electronic calendar is shown here, the manage priorities pop-up window 750 may be presented in another browser tab, or on a separate window, screen or electronic device. The manage priorities pop-up window 750 may further depict occasions 780 with timing values 760 and substance values 770 associated with the occasions 780. An input area 790 allows a user to input importance values and timing values for each of the one or more occasions. The importance values and timing values entered here may be used as training data for one or more machine learning models as explained above, and may further be used to generate the graphical depictions as shown in FIGS. 5-6. In this manner, the GUI 700 provides an improved means for collecting, analyzing and displaying calendar data to a user.

The improved GUI described above in FIGS. 5-7 is thus a technical solution that presents data on a database in a manner that is easier for users to understand and manage. In particular, existing calendar software does not provide a GUI with the metrics gathered here in order to improve the usability of the software and guide users on progress based on real time data. Further, this implementation is technologically scalable to a large enterprise and may be implemented on individual user devices in the network.

It should be understood that embodiments in this disclosure are exemplary only, and that other embodiments may include various combinations of features from other embodiments, as well as additional or fewer features. For example, while some of the embodiments above pertain to analyzing a request to add a new occasion to an electronic database, any suitable activity may be used. In an exemplary embodiment, instead of or in addition to a request to add a new occasion to an electronic database, the method for analyzing data on a database includes analyzing the impact an enterprise-wide occasion may have on progress scores and goals. For example, if across an enterprise, an extra day off was provided to employees or if a daily break was instituted, the occasion data may be analyzed and progress scores can be generated to determine the impact that extra day or daily break had on calendars across the enterprise over a time period. In some embodiments, the timing and substance values and progress scores for a calendar may be used as a transparent and clear metric to measure employee performance.

In general, any process or operation discussed in this disclosure that is understood to be computer-implementable, such as the processes illustrated in FIGS. 2 and 3, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 8:
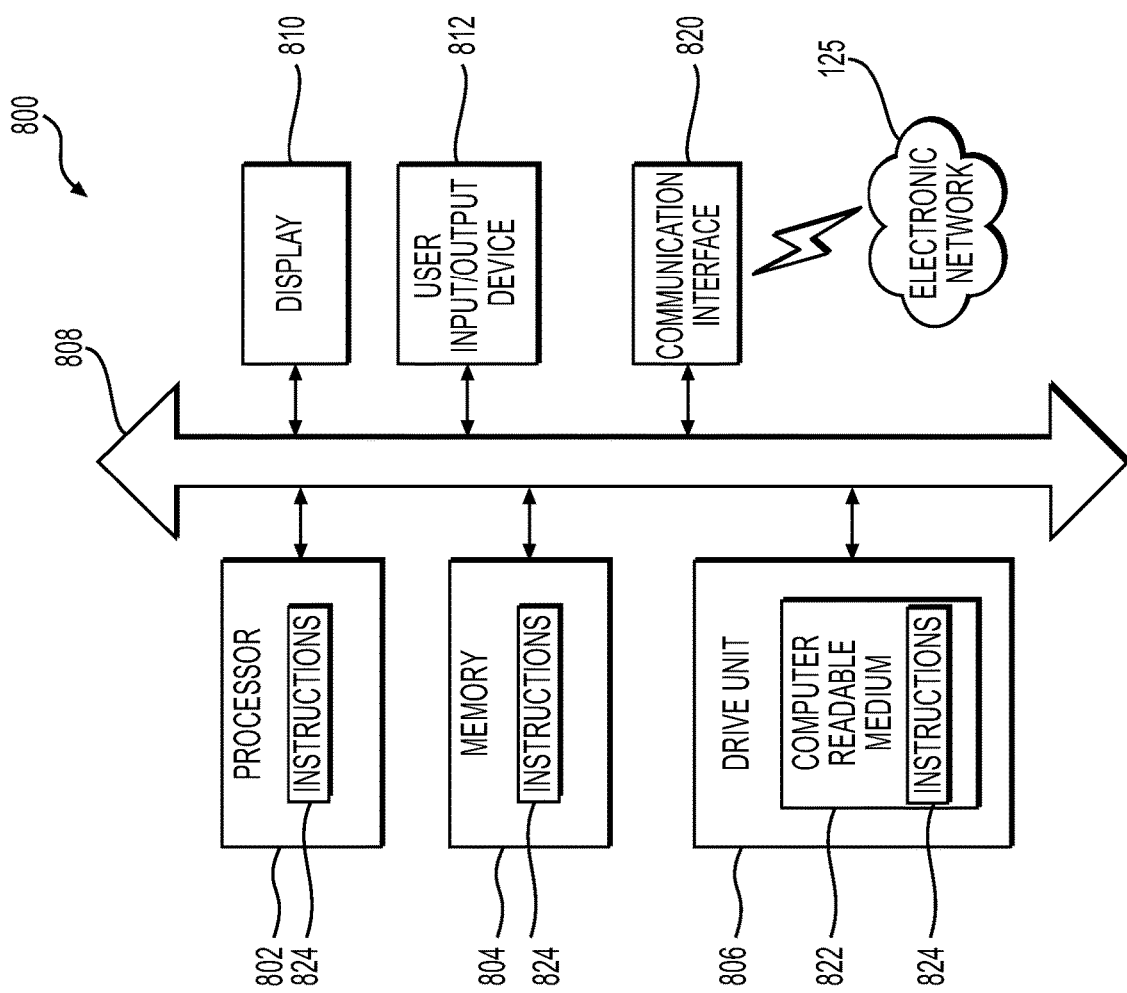
FIG. 8 depicts an example of a computing device, according to one or more embodiments.

FIG. 8 is a simplified functional block diagram of a computer 800 that may be configured as a device for executing the methods of FIGS. 2 and 3, according to exemplary embodiments of the present disclosure. For example, the computer 800 may be configured as the electronic calendar engine system 150 and/or another system according to exemplary embodiments of this disclosure. In various embodiments, any of the systems herein may be a computer 800 including, for example, a data communication interface 820 for packet data communication. The computer 800 also may include a central processing unit ("CPU") 802, in the form of one or more processors, for executing program instructions. The computer 800 may include an internal communication bus 808, and a storage unit 806 (such as ROM, HDD, SDD, etc.) that may store data on a computer readable medium 822, although the computer 800 may receive programming and data via network communications. The computer 800 may also have a memory 804 (such as RAM) storing instructions 824 for executing techniques presented herein, although the instructions 824 may be stored temporarily or permanently within other modules of computer 800 (e.g., processor 802 and/or computer readable medium 822). The computer 800 also may include input and output ports 812 and/or a display 810 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for analyzing data using machine learning models, the method comprising:
    receiving, by one or more processors, data associated with a request to add a new occasion to an electronic database, wherein:
        the electronic database includes a plurality of occasions;
        at least a portion of the plurality of occasions is associated with a timing value and a substance value;
        the electronic database is associated with a first progress value determined based on the timing values and the substance values of the plurality of occasions;
        the data associated with the request to add the new occasion is at least partially automatically generated by a first trained machine learning model; and
        the first trained machine learning model is trained based on (i) training occasion data that includes information regarding one or more occasions associated with one or more electronic databases and (ii) progress value data including a progress value for each of the one or more electronic databases to learn relationships between the training occasion data and the progress value data, such that the first trained machine learning model is configured to use the learned relationships to generate a new occasion that will result in a second progress value that exceeds the first progress value;
    receiving, by the one or more processors, data associated with the new occasion;
    predicting, by a second trained machine learning model executed by the one or more processors, a timing value and a substance value for the new occasion,
        wherein the second trained machine learning model is trained, based on (i) training occasion data that includes information regarding one or more occasions associated with one or more electronic databases and (ii) training value data that includes a prior timing value and substance value for each of the one or more occasions, to learn relationships between the training occasion data and the training value data, such that the second trained machine learning model is configured to use the learned relationships to determine the substance value and timing value for the new occasion in response to input of the data associated with a request to add a new occasion to the electronic database and data associated with the new occasion;
    calculating, by the one or more processors, a second progress value for the electronic database based on the timing value and the substance value for the new occasion; and
    upon determining that the second progress value exceeds the first progress value, causing, by the one or more processors, a graphical user interface to display a notification to add the new occasion to the electronic database.

2. The computer-implemented method of claim 1, further comprising:
    upon determining that the second progress value does not exceed the first progress value, automatically declining, by the one or more processors, the request to add the new occasion to the electronic database.

3. The computer-implemented method of claim 1, further comprising:
    receiving user input data indicating the substance value and the timing value associated with one or more of the plurality of occasions; and
    generating, by the one or more processors, a tuned machine learning model, by further training the second trained machine learning model using (i) the user input data, and (ii) data associated with one or more of the plurality of occasions, such that the learned relationships are updated based on the user input data and the data associated with the one or more of the plurality of occasions.

4. The computer-implemented method of claim 1, wherein the data associated with the request to add the new occasion is at least partially received by the graphical user interface.

5. The computer-implemented method of claim 1, further comprising:
    upon determining that the second progress value exceeds the first progress value, calculating, by the one or more processors, a coverage value based on attendee data for the new occasion; and
    upon determining that the coverage value does not exceed a predetermined threshold, causing, by the one or more processors, the graphical user interface to display a notification to decline adding the new occasion to the electronic database.

6. The computer-implemented method of claim 1, further comprising:
    causing, by the one or more processors, the graphical user interface to display the electronic database, a selectable visual priorities tab, a selectable manage priorities tab, and a selectable trending data tab; and
    upon a user selection of the selectable manage priorities tab, causing, by the one or more processors, the graphical user interface to display the timing value and the substance value for each occasion of the plurality of occasions.

7. The computer-implemented method of claim 6, further comprising:
    calculating, by the one or more processors, a plurality of progress values for the electronic database over a time period; and
    upon a user selection of the selectable trending data tab, causing, by the one or more processors, the graphical user interface to display a graphic depicting the plurality of progress values and the time period.

8. The computer-implemented method of claim 7, further comprising:
    upon a user selection of the selectable visual priorities tab, causing, by the one or more processors, the graphical user interface to display graphical depictions of each of the plurality of occasions arranged according to the timing value and substance value of each of the plurality of occasions,
        wherein the graphical depictions of each of the plurality of occasions are further arranging on a coordinate graph with an x-axis corresponding to substance values and a y-axis corresponding to timing values.

9. The computer-implemented method of claim 1, wherein at least a portion of the plurality of occasions of the electronic database were generated based on one or more user inputs via the graphical user interface.

10. The computer-implemented method of claim 1, wherein the information regarding the one or more occasions associated with one or more electronic databases further comprises information including attendee data, subject data, and time data for at least a portion of the one or more occasions associated with the one or more electronic databases.

11. A system for analyzing data using machine learning models, the system comprising:
at least one memory storing instructions; and
at least one processor executing the instructions to perform a process including:
receiving data associated with a request to add a new occasion to an electronic database, wherein:
the electronic database includes a plurality of occasions;
at least a portion of the plurality of occasions is associated with a timing value and a substance value;
the electronic database is associated with a first progress value determined based on the timing values and the substance values of the plurality of occasions;
the data associated with the request to add the new occasion is at least partially generated automatically by a first trained machine learning model; and
the first trained machine learning model is trained based on (i) training occasion data that includes information regarding one or more occasions associated with one or more electronic databases and (ii) progress value data including a progress value for each of the one or more electronic databases to learn relationships between the training occasion data and the progress value data, such that the first trained machine learning model is configured to use the learned relationships to generate a new occasion that will result in a second progress value that exceeds the first progress value;
receiving data associated with the new occasion;
predicting, by a second trained machine learning model, a timing value and a substance value for the new occasion,
wherein the second trained machine learning model is trained, based on (i) training occasion data that includes information regarding one or more occasions associated with one or more electronic databases and (ii) training value data that includes a prior timing value and substance value for each of the one or more occasions, to learn relationships between the training occasion data and the training value data, such that the second trained machine learning model is configured to use the learned relationships to determine the substance value and timing value for the new occasion in response to input of the data associated with a request to add a new occasion to the electronic database and data associated with the new occasion;
calculating a second progress value for the electronic database based on the timing value and the substance value for the new occasion; and
upon determining that the second progress value exceeds the first progress value, causing a graphical user interface to display a notification to add the new occasion to the electronic database.

12. The system of claim 11, wherein the process further includes:
upon determining that the second progress value does not exceed the first progress value, automatically declining the request to add the new occasion to the electronic database.

13. The system of claim 11, wherein the process further includes:
receiving user input data indicating the substance value and the timing value associated with one or more of the plurality of occasions; and
generating a tuned machine learning model, by further training the second trained machine learning model using (i) the user input data, and (ii) data associated with the one or more of the plurality of occasions, such that the learned relationships are updated based on the user input data and the data associated with the one or more of the plurality of occasions.

14. The system of claim 11, wherein the data associated with the request to add the new occasion is at least partially received by the graphical user interface.

15. The system of claim 11, wherein the process further includes:
upon determining that the second progress value exceeds the first progress value, calculating a coverage value based on attendee data for the new occasion; and
upon determining that the coverage value does not exceed a predetermined threshold, causing a graphical user interface to display a notification to decline adding the new occasion to the electronic database.

16. The system of claim 11, wherein the process further includes:
causing the graphical user interface to display the electronic database, a selectable visual priorities tab, a selectable manage priorities tab, and a selectable trending data tab; and
upon a user selection of the selectable manage priorities tab, causing, by the one or more processors, the graphical user interface to display the timing value and the substance value for each occasion of the plurality of occasions.

17. The system of claim 16, wherein the process further includes:
calculating a plurality of progress values for the electronic database over a time period; and
upon a user selection of the selectable trending data tab, causing the graphical user interface to display a graphic depicting the plurality of progress values and the time period.

18. The system of claim 17, wherein the process further includes:
upon a user selection of the selectable visual priorities tab, causing the graphical user interface to display graphical depictions of each of the plurality of occasions arranged according to the timing value and substance value of each of the plurality of occasions,
wherein the graphical depictions of each of the plurality of occasions are further arranging on a coordinate graph with an x-axis corresponding to substance values and a y-axis corresponding to timing values.

19. The system of claim 11, wherein the information regarding the one or more occasions associated with one or more electronic databases further comprises information including attendee data, subject data, and time data for at least a portion of the one or more occasions associated with the one or more electronic databases.

20. A computer-implemented method for analyzing data using machine learning models, the method comprising:
- receiving, by one or more processors, data associated with a request to add a new occasion to an electronic database, wherein:
  - the electronic database includes a plurality of occasions;
  - at least a portion of the plurality of occasions is associated with a timing value and a substance value; and
  - the electronic database is associated with a first progress value determined based on the timing values and the substance values of the plurality of occasions;
- receiving, by the one or more processors, data associated with the new occasion;
- training, by the one or more processors, a machine learning model to predict a timing value and a substance value for the new occasion,
  - wherein the machine learning model is trained, based on (i) training occasion data that includes information regarding one or more occasions associated with one or more electronic databases and (ii) training value data that includes a prior timing value and substance value for each of the one or more occasions, to learn relationships between the training occasion data and the training value data, such that the machine learning model is configured to use the learned relationships to determine the substance value and timing value for the new occasion in response to input of the data associated with a request to add a new occasion to the electronic database and data associated with the new occasion;
- receiving, by the one or more processors, user input data indicating the substance value and the timing value associated with one or more of the plurality of occasions;
- tuning, by the one or more processors, the machine learning model to generate a tuned machine learning model by using (i) the user input data, and (ii) data associated with the one or more of the plurality of occasions, such that the learned relationships are updated based on the user input data and the data associated with the one or more of the plurality of occasions;
- predicting, by the one or more processors, a timing value and a substance value for the new occasion;
- calculating, by the one or more processors, a second progress value for the electronic database based on the timing value and the substance value for the new occasion; and
- upon determining that the second progress value exceeds the first progress value, causing, by the one or more processors, a graphical user interface to display a notification to add the new occasion to the electronic database.

* * * * *